June 22, 1965 A. W. KUMPF 3,190,251
VESSEL HAVING TWIN RUDDERS WITH CONTROLLED TOE-OUT
Filed Aug. 8, 1962 5 Sheets-Sheet 1

INVENTOR.
AUGUST W. KUMPF
BY
ATTORNEY

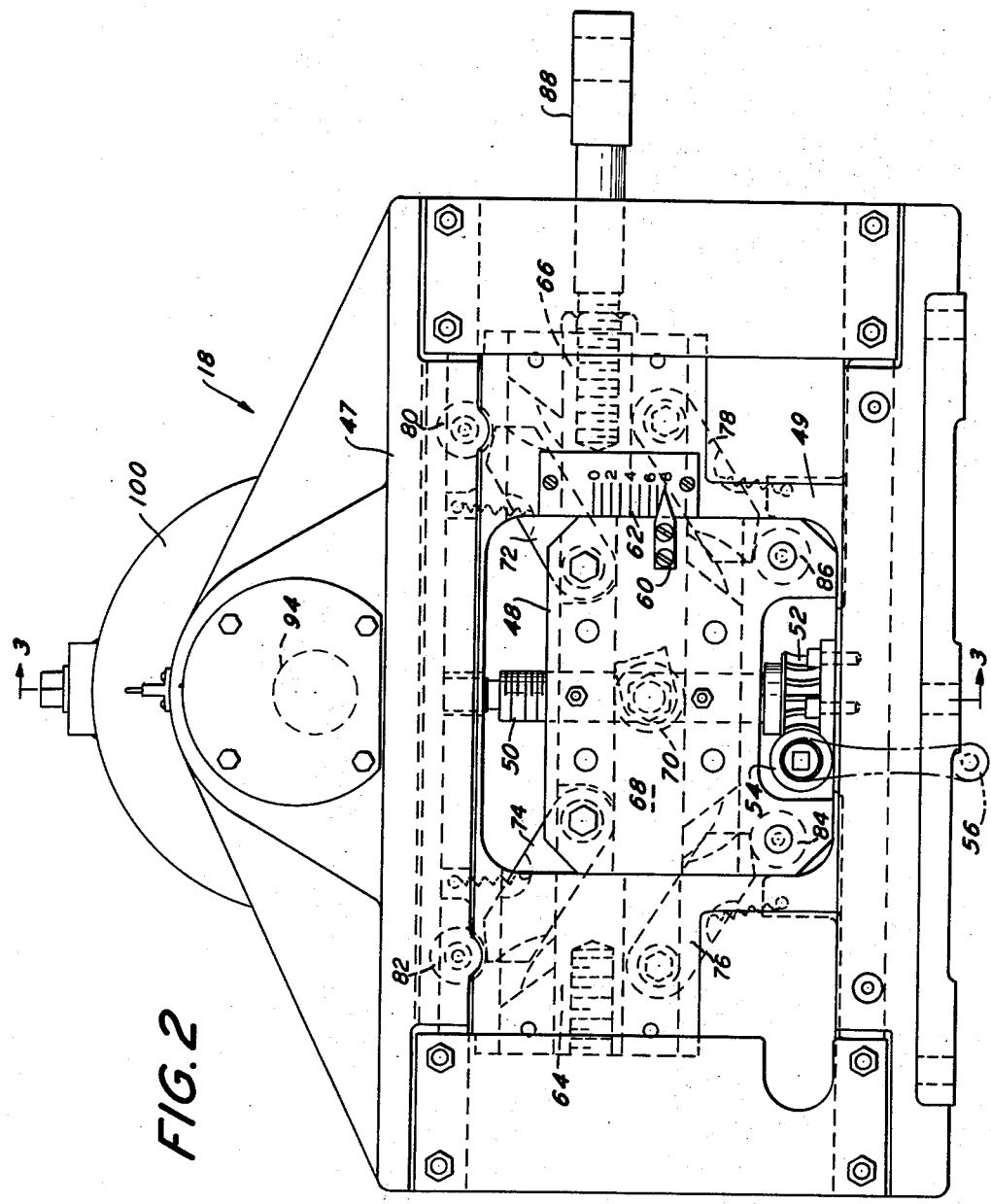

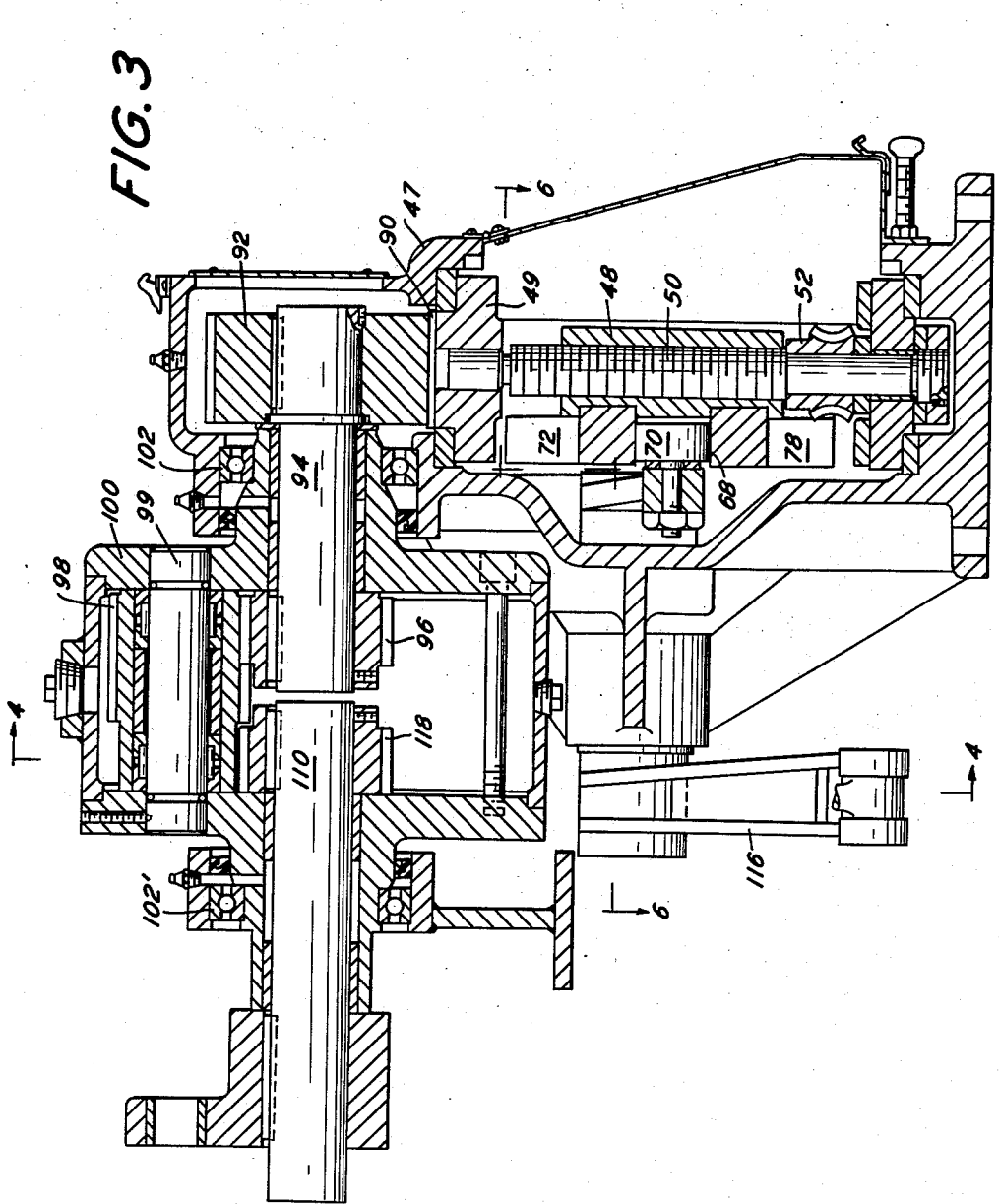

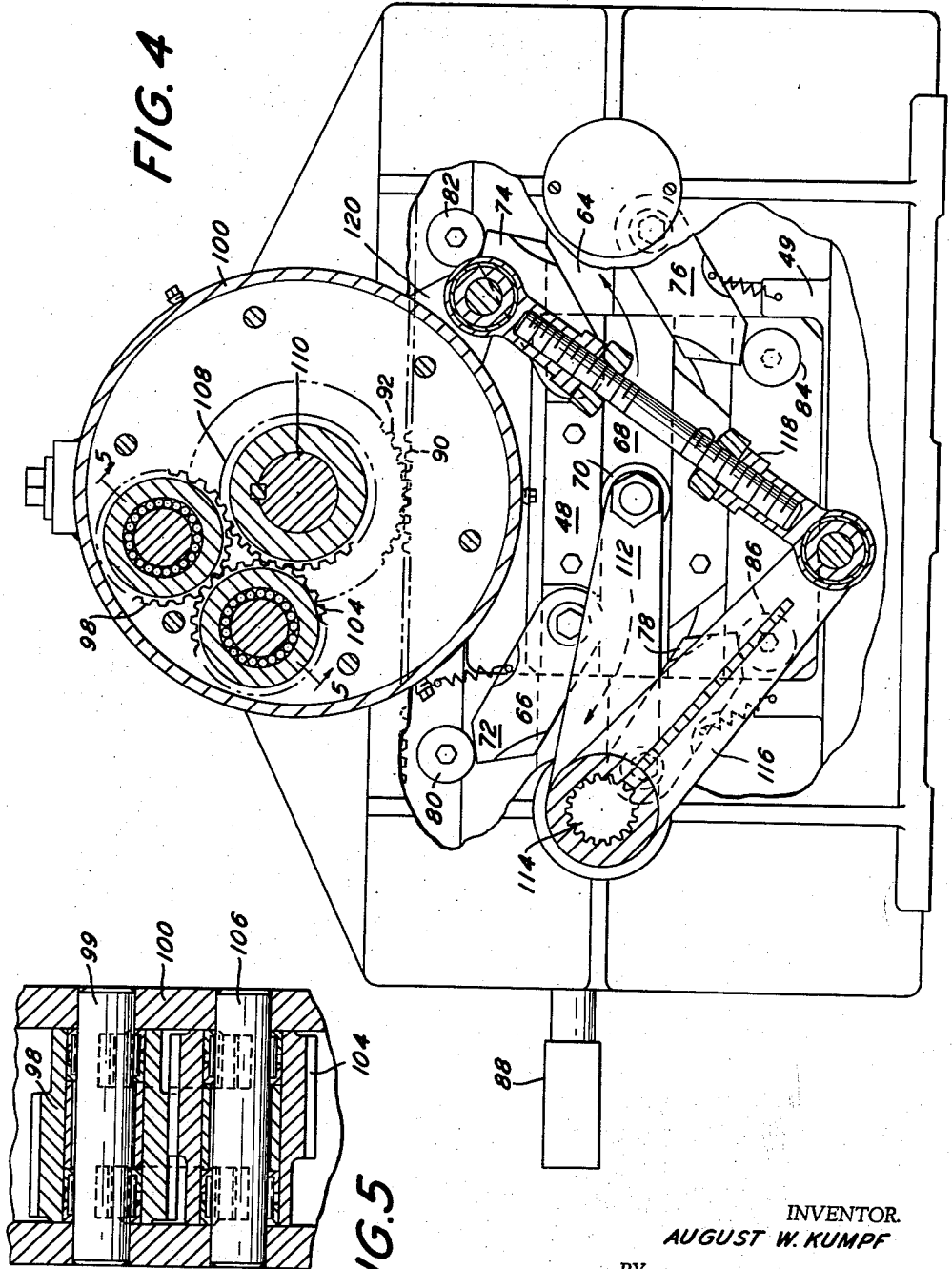

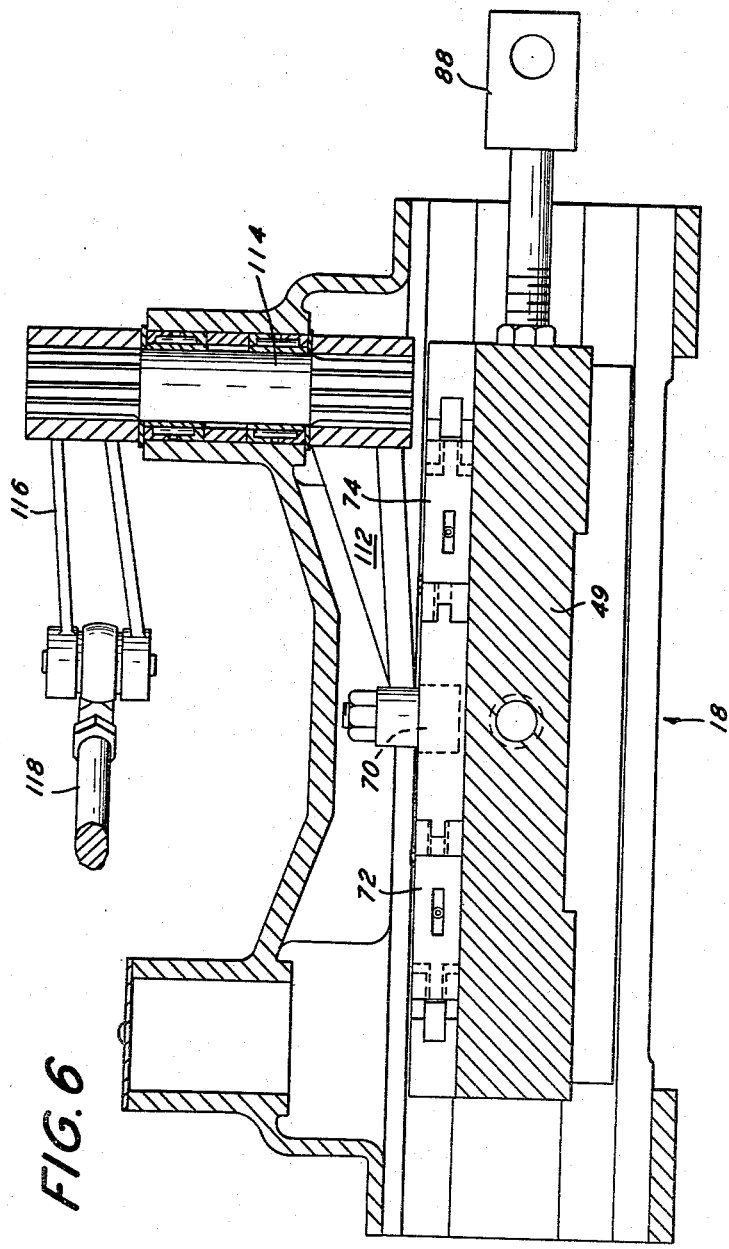

United States Patent Office 3,190,251
Patented June 22, 1965

3,190,251
VESSEL HAVING TWIN RUDDERS WITH CONTROLLED TOE-OUT
August W. Kumpf, Conshohocken, Pa., assignor to C. H. Wheeler Manufacturing Company, Philadelphia, Pa., a corporation of Pennsylvania
Filed Aug. 8, 1962, Ser. No. 215,721
14 Claims. (Cl. 114—163)

This invention relates to a vessel having twin rudders with controlled toe-out.

The present invention is particularly adapted for large seagoing vessels which require a toe-out of the rudders, in restricted waters for maximum control, better maneuverability, and quicker rudder response. For long open water cruising, both rudders should be streamlined to reduce frictional resistance and offer a saving on fuel. Also, the controlled toe-out of the rudders reduces yaw by equalizing the side thrust.

The present invention was successfully tested on a large vessel having a length of nine hundred feet and a tonnage capacity of more than one hundred thousand tons. It will be readily ascertained by those skilled in the art that a vessel of this length and size will have a substantial amount of yaw at the bow thereof. The twin rudders of the present invention substantially reduce the amount of said yaw. The rudders of the present invention are adjustable from a streamlined position to eight degrees toe-out. The setting and adjusting of the rudders can be accomplished simultaneously or singularly as desired, while the vessel is underway or in port by merely turning a small crank.

In accordance with the present invention, a steering system is provided wherein each rudder is provided with a ram group. Control of the rudders is effected through a gyropilot power unit coupled to a bias differential control unit which in turn is coupled to a storage motion differential control unit for each ram group. The amount of toe-out of the rudders is attained by adjusting the bias differential control unit for each rudder.

The bias differential control unit is a particularly novel portion of the present invention. Each bias differential control unit includes a spur gear differential of the planetary type. This unit enables each rudder to selectively have a maximum toe-out or toe-in position of approximately thirty-five degrees. When it is desired to have each rudder thirty-five degrees right, the rudders will assume this position notwithstanding the fact that one rudder will move through an arc which is smaller than the arc of the other rudder as a result of an initial toe-out on the rudders.

It is an object of the present invention to provide a seagoing vessel with twin rudders having controlled toe-out.

It is another object of the present invention to provide a novel steering system for twin rudders for large vessels.

It is another object of the present invention to provide a novel bias differential control unit.

It is another object of the present invention to provide a novel bias differential control unit facilitating rapid adjustment of rudder toe-out and controlled differential motion for twin rudders.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a schematic illustration of the steering system in accordance with the present invention.

FIGURE 2 is a front elevation view of the bias differential control unit of the present invention.

FIGURE 3 is a sectional view taken along the lines 3—3 in FIGURE 2.

FIGURE 4 is a sectional view taken along the lines 4—4 in FIGURE 3.

FIGURE 5 is a sectional view taken along the lines 5—5 in FIGURE 4.

FIGURE 6 is a sectional view taken along the lines 6—6 in FIGURE 3.

Referring to the drawing in detail, wherein like numerals indicate like elements, there is shown in FIGURE 1 a steering system for twin rudders of a seagoing vessel designated generally as 10.

Figure 1A:
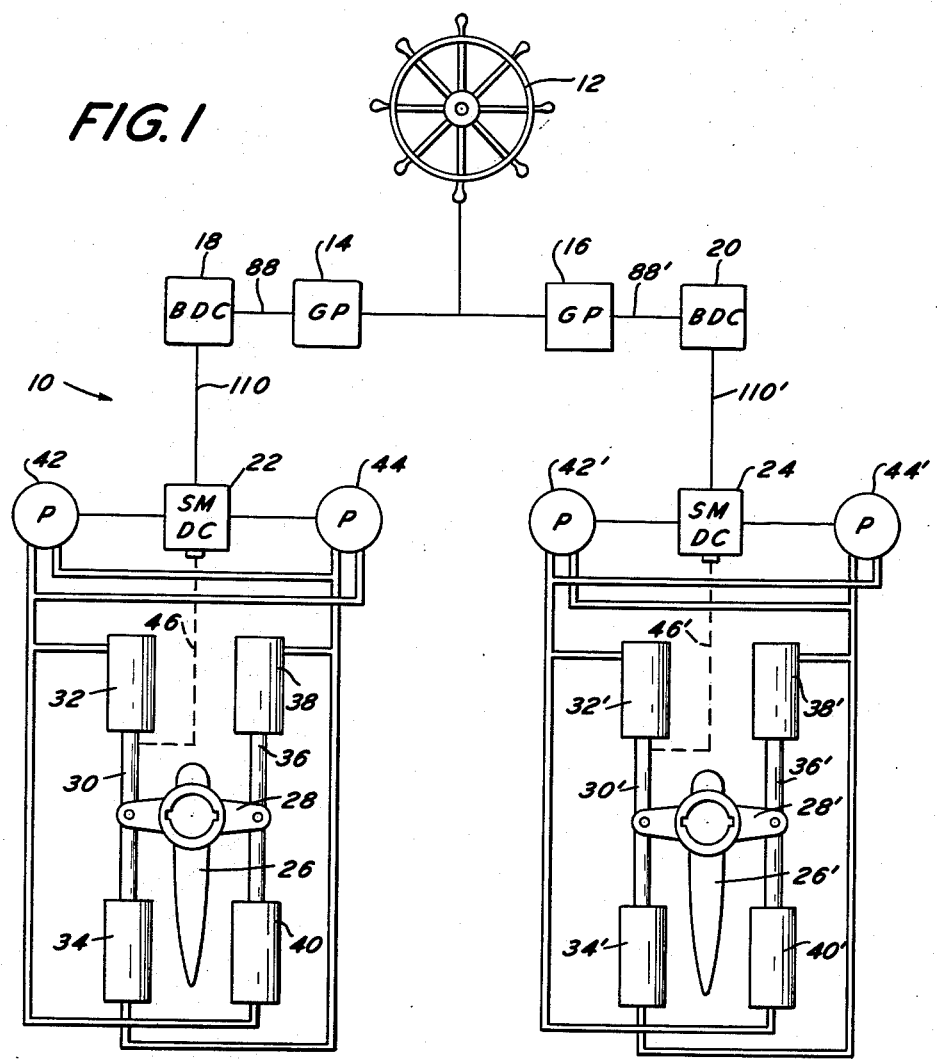
FIGURE 1a is a diagrammatic illustration of the rotative movements of the rudders.

The steering system includes a handwheel selectively coupled to a connection between a pair of gyropilot power units designated generally as 14 and 16. The power units 14 and 16 are conventional and are commercially available. Unit 14 is coupled to a bias differential control unit 18. Unit 16 is coupled to a bias differential control unit 20.

Unit 18 is coupled to a storage motion differential control 22 of the ram group for rudder 26. Unit 20 is coupled to storage motion differential control 24 of the ram group for rudder 26'. Each of the ram groups are identical. Hence, only the ram group for rudder 26 will be explained in detail. The components of the other ram group are illustrated with corresponding primed numerals.

The rudder 26 is secured to a hub 28. The hub 28 is rotatably supported by means not shown. Hub 28 is pivotably secured to a piston rod 30. The ends of piston rod 30 are secured to pistons within the cylinders 32 and 34. The opposite side of hub 28 is pivotably coupled to piston rod 36. The ends of piston rod 36 are secured to pistons within the cylinders 38 and 40.

Pumps 42 and 44 are coupled to the cylinders by a hydraulic circuit. When the pumps 42 and 44 are operating, they pump hydraulic fluid into the cylinders so that piston rod 30 reciprocates in a direction opposite to the direction of reciprocation of piston rod 36 thereby rotating the rudder 26. The pumps 42 and 44 may be conventional and commercially available Hele Shaw Hydraulic Pumps. The pumps 42 and 44 are coupled to the storage motion differential control 22. A feedback 46 is coupled between the piston rod 30 and the storage motion differential control 22.

The storage motion differential control 22, per se, forms no part of the present invention since the same is conventional and commercially available. One type of storage motion control which may be utilized includes three beveled gears and a cam arrangement. One beveled gear is connected to the feedback 46. Another beveled gear is connected to the bias differential control unit 18 by a worm wheel and spur gear reduction unit. The third beveled gear is mounted in a hardened cam. The cam is assembled and rotates between two adjustable hardened rollers mounted in a cradle attached to the stroke control for the pumps 42 and 44. As a result of the last mentioned relationship, only one of the pumps 42 and 44 will be hydraulically coupled to the cylinders at any one time.

The bias differential control units 18 and 20 are identical. Only unit 18 will be described in detail. Unit 18 is shown more clearly in the illustrations of FIGURES 2–6. As shown more clearly in FIGURE 2, the control unit 18 includes a housing 47 having a reciprocally supported crosshead 49. The crosshead 49 is provided with a central rectangular shaped aperture within which is disposed a reciprocal indicator block 48.

The indicator block 48 is threadedly coupled to a non-reciprocating lead screw 50 supported by the crosshead 49. A worm wheel 52 is coupled to the lead screw 50. A worm screw 54 is meshingly engaged with the teeth on worm wheel 52. A handle 56 is coupled to the worm screw 54. Rotation of handle 56 causes vertical reciprocation of the block 48. Block 48 is provided with a pointer 60 which cooperates with a graduated indicator plate 62 on the crosshead 49.

As shown in FIGURE 4 and in phantom in FIGURE 2, the crosshead 49 is provided with a pair of channels 64 and 66. The block 48 is provided with a channel 68 thereacross. When the pointer 60 is juxtaposed to the zero marking on the indicator plate 62, the channel 68 is in line with and forms a continuation of the channels 64 and 66. A cam follower 70 is disposed within the channel 68.

The block 48 is provided with a pair of pivotably mounted links 72 and 74 at the upper edge thereof. The free ends of the links are spring biased into rolling contact with rollers 80 and 82, respectively, on crosshead 49. A pair of links 76 and 78 are pivotably supported by the crosshead 49 and spring biased into rolling contact with rollers 84 and 86 on the block 48.

When channel 68 is in line with the channels 64 and 66, the links 72–78 are inoperative. When the block 48 has been lowered to a position such as that illustrated in FIGURE 2, the links 74 and 76 provide a connecting channel for movement of the cam follower 70 between channels 64 and 68. Likewise, the links 72 and 78 form a connecting channel for the cam follower between channels 66 and 68. Hence, the links 72, 74, 76, and 78 enable the cam follower 70 to move from channel 64 to channel 66 by way of channel 68 notwithstanding the fact that channel 68 is offset with respect thereto.

The gyropilot power unit 14 is coupled to the bias differential control unit 18 by a shaft 88. The end of the shaft 88 illustrated in FIGURE 2 is threadedly connected to the crosshead 49. Reciprocatory movement of rod 88 by the power unit 14 causes reciprocation of the crosshead 49. A rack 90 is provided on the upper surface of the crosshead 49. As shown more clearly in FIGURES 3 and 4, a pinion 92 is meshingly engaged with the rack 90.

The pinion 92 is coupled to a shaft 94. The end of shaft 94 remote from pinion 92 extends into a sun gear planetary differential and terminates in a sun gear 96. Sun gear 96 is meshed with a spur gear 98 which in turn is rotatably supported by a shaft 99 extending through the gear differential casing 100. The gear differential casing 100 is rotatably supported by bearings 102 and 102'. Spur gear 98 is meshed with spur gear 104 as shown more clearly in FIGURES 4 and 5. Gear 104 is meshed with gear 118 on output shaft 110. Output shaft 110 is to be coupled to the storage motion differential control 22.

As shown more clearly in FIGURES 4 and 6, the cam follower 70 is secured to one end of a lever 112. The other end of lever 112 is coupled to a rotatably supported shaft 114. The other end of shaft 114 is splined to a lever 116. The free end of lever 116 is pivotably coupled to a sectional adjustable connecting arm 118. The end of arm 118 remote from lever 116 is rotatably connected to an ear 120 fixedly secured to the casing 100.

The handwheel 12 is releasably coupled to the gyropilot power units for maximum flexibility. The last mentioned units are preferably disposed on the bridge and are provided with handwheels to facilitate automatic operation of both units. If desired, only a single one of the last mentioned units may be operated.

*Operation*

Let it be assumed that the rudders 26 and 26' are in the streamlined position and the vessel is in port. Before moving out of port, the handle 56 will be cranked on each of the differential bias control units 18 and 20 to provide a toe-out on the rudders. Let it be assumed that the handles have been cranked so that the elements assume the position in FIGURE 2 whereby the rudders 26 and 26' have an eight degree toe-out. Hence, the rudders will assume the solid line position illustrated in FIGURE 1a.

As the handles are cranked to provide a tow-out on the rudders, the block 48 descends thereby rotating the levers 112 and 116 which in turn cause rotation of the differential casing 100. Rotation of the casing 100 is transmitted into a rotary signal through the shaft 110 to the storage motion differential control 22 which in turn actuates one of the pumps 42 and 44 to rotate the rudder 26.

Referring to FIGURE 6, it will be noted that the shaft 114 is rotatably supported on the righthand side of the differential bias control unit 18. A similar bore is provided on the lefthand side of the bias differential control unit 18 for receiving similar components. The bias differential control unit 20 will be identical with the unit 18, except that the shaft comparable to shaft 114 will be on the lefthand side of the unit when viewed as illustrated in FIGURE 6. Hence, reciprocation of the block 48 in the unit 20 will cause the casing of the spur gear differential to rotate in an opposite direction. In this manner, the cam follower 70 on each of the bias differential control units 18 and 20 will descend or ascend, while the effect of such movement on the cam follower 70 will cause the spur gear differential on the unit 18 to add to the rotary output while the spur gear differential on the unit 20 will subtract from the rotary output.

Referring again to FIGURE 1a, it will be noted that each of the rudders have an eight degree toe-out. Let it be assumed that it is desired for a particular movement of the vessel that each rudder be thirty-five degrees right. It will be noted that rudder 26 must rotate through an arc of forty-three degrees while rudder 26' need only rotate through an arc of twenty-seven degrees. Each of the gyropilot power units 14 and 16 will be operated or otherwise manipulated to cause the rudders to rotate through an arc of thirty-five degrees right. However, the bias differential control unit 18 will add eight degrees to the rotary movement of the rudder 26 and unit 20 will subtract eight degrees from the rotary movement of the rudder 26'.

Figure 1A:
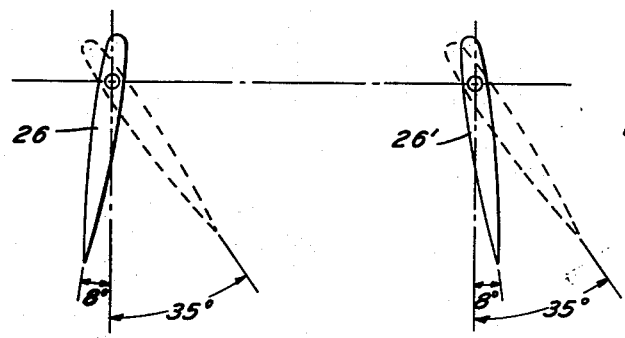

As a function of the signal from the power unit 14, the shaft 88 will reciprocate to the left in FIGURES 1, 2 and 6. Such movement causes the rack 90 on the crosshead 49 to rotate the pinion 92 and shaft 94 in a clockwise direction in FIGURE 2. Such rotation of the shaft 94 is coupled through the gears 96, 98 and 118 to the output shaft 110. As crosshead 49 reciprocates, block 48 and lead screw 50 move therewith. As the crosshead 49 reciprocates to the left in FIGURE 2, the cam follower 70 rides upwardly between the links 72 and 78. Such movement of the cam follower 70 is transmitted through the lievers 112 and 116 to the differential casing 100 thereby adding to the output signal of shaft 110.

The crosshead 49 in the bias differential control unit 20 will reciprocate in the same direction as described above and an output signal will be generated as a response thereto in the same manner. However, since the levers corresponding to levers 112 and 116 will be on the opposite side of the unit and are coupled to the differential casing on the opposite side thereof, movement of the cam follower will cause rotation of the differential casing in an opposite direction thereby subtracting from the output signal. The amount of subtraction or addition effected by the differential casing of the units 18 and 20 is a direct function of the amount of initial toe-out on the rudders 26 and 26'. In this regard, it will be noted that the differential casing will neither add nor subtract when the channel 68 is in line with the channels 64 and 66.

Such alignment occurs when there is zero degrees toe-out, otherwise identified as the rudders being in their streamlined position.

When the vessel is out at sea in open waters, it is more economical for the fuel consumption of the vessel to have the rudders 26 and 26' in their streamlined position. The fact that the ship is underway in open waters has no effect on the present invention since the rudders may be rapidly moved to their streamlined position by rotating the crank handle 56 on each of the bias differential control units.

The length of the channel 68 is directly related to the range of the helm angle, right or left, during which the rudders will maintain their toe-out increment. Depending upon the size of the vessel, this range may be varied as desired. In an operative embodiment of the present invention, the range was approximately twenty degrees right to twenty degrees left helm angle. An example of the movements associated with this example is as follows. Assume that the rudders have an initial toe-out of eight degrees. Assume that a signal is received requiring the rudders to be thirty-five degrees left.

It will be assumed that the ram group for rudder 26 is the port ram group. When the steering wheel is rotated to twenty degrees left rudder, the rudder 26 will move to twenty-eight degrees left while the rudder 26' will move to twelve degrees left. Then the steering wheel will be further rotated to thirty-two degrees left rudder. Rudder 26 will then move to thirty-two degrees left while rudder 26' moves to thirty-two degrees left. Thereafter, the steering wheel will be further rotated to thirty-five degrees left rudder and each of the rudders 26 and 26' will simultaneously rotate to thirty-five degrees left rudder.

As used hereinafter, a bias differential control unit is to be interpreted as a device capable of receiving a signal from a gyropilot to effect movement of a rudder to a desired position, said unit being capable of sending a signal to effect such movement regardless of whether its rudder is in a streamlined position or in a position different from its companion rudder, including positions of toe-in or toe-out.

It will be obvious to those skilled in the art that the present invention contemplates a toe-out or toe-in position for the rudders. Further, the zero to eight degree range for toe-out described above is an arbitrary figure and may be increased or decreased if desired.

The present invention may be embodied in other specific forms without departing from the spirit or essential attributes thereof and, accordingly, reference should be made to the appended claims, rather than to the foregoing specification as indicating the scope of the invention.

I claim:

1. In a steering system for a large vessel comprising first and second rudders, a first ram group for selectively rotating said first rudder, a second ram group for selectively rotating said second rudder, each ram group including a storage motion differential control, a bias differential control unit coupled to each storage motion differential control and to a gyropilot unit, said bias differential control units including means for moving said rudders in opposite directions from a streamline position, and said rudders being adapted to assume identical right or left angular positions in response to a signal from said bias differential control units.

2. In a system in accordance with claim 1 wherein each bias differential control unit includes a housing with a crosshead movably supported in said housing, a differential, means structurally interrelating said crosshead in differential so that said differential provides an output signal as a function of the amount of movement of said crosshead, and adjustable means on said crosshead to vary the amount of the output signal from said differential.

3. In a system in accordance with claim 1 wherein each bias differential control unit includes a movable crosshead structurally interrelated with a differential to provide an output signal from said differential as a function of the amount of movement of said crosshead, and the signals from the differential differing as a function of the difference in initial positions of said rudders.

4. In a system in accordance with claim 1 wherein said means for moving each rudder enables each rudder to be selectively manipulated to any position between eight degrees toe-out and eight degrees toe-in.

5. In a steering system for a large vessel comprising first and second rudders, a first means for selectively rotating said first rudder, a second means for selectively rotating said second rudder, a bias differential control unit coupled to each of said first and second means, a gyropilot unit coupled to each of said bias differential control units, said bias differential control units including means for moving each rudder to a toe-out position, and said rudders being adapted to assume identical right or left positions in response to a signal from said bias differential control units.

6. In a system in accordance with claim 5 wherein each bias differential control unit includes a movable crosshead structurally interrelated with a differential, said differential providing an output signal as a function of the amount of movement of said crosshead, and said means for moving each rudder to a toe-out position being interrelated with said differential to vary the amount of the output signal from said differential.

7. A bias differential control unit comprising a housing, a crosshead movably supported by said housing, a differential, means structurally interrelating said crosshead and differential so that said differential provides an output signal as a function of the amount of movement of said crosshead, and adjustable means on said crosshead to vary the amount of the output signal from said differential.

8. A unit in accordance with claim 7 wherein said adjustable means on said crosshead includes a member supported by said crosshead for movement in a direction transverse to the direction of movement of said crosshead with respect to said housing, and linkage means interconnecting said member and said differential.

9. A unit in accordance with claim 7 wherein said means interrelating said crosshead and said differential includes a rack on said crosshead, a pinion in meshing engagement with said rack, said pinion being coupled to the input side of said differential.

10. A bias differential control unit comprising a housing, a crosshead reciprocally supported by said housing, a differential, means structurally interrelating said crosshead and said differential in a manner so that an output signal from said differential is a function of the amount of reciprocation of said crosshead, a selectively adjustable member on said crosshead supported for movement in a direction transverse to the direction of reciprocation of said crosshead, and linkage means structurally interrelating said member and said differential in a manner so that an output signal from said differential is responsive to the position of said member.

11. A unit in accordance with claim 10 wherein said crosshead is provided with a channel, said member being provided with a channel, said channels being in line with one another in a first position of said member, and said linkage means including a cam follower adapted to reciprocate in said channels.

12. A unit in accordance with claim 11 including means for interconnecting said channels so that said cam follower may move from one channel to the other channel when said member is in a second position, and said channels being offset with respect to each other when said member is in said second position.

13. A unit in accordance with claim 12 wherein said last mentioned means includes a pivotably mounted link supported by said member and a pivotably mounted link supported by said crosshead, and means biasing said links to a position so that the distance between said links always corresponds to the distance across the width of said channels.

14. In a steering system for a large vessel comprising first and second rudders, a first ram group for selectively rotating said first rudder, a second ram group for selectively rotating said second rudder, each ram group including a bias differential control unit capable of receiving a signal and transmitting a signal to its ram group for moving its respective rudder in opposite directions from a stream line position to toe-out positions and for causing the rudders to assume identical right or left angular positions in response to a different signal communicated to the bias differential control units.

References Cited by the Examiner
UNITED STATES PATENTS

| | | | |
|---|---|---|---|
| 2,282,194 | 5/42 | Lamond | 114—150 |
| 2,667,746 | 2/54 | Kumpf et al. | 114—144 X |
| 2,780,917 | 2/57 | Lamond | 60—52 |
| 2,796,576 | 6/57 | Braddon et al. | 114—144 X |
| 3,009,435 | 11/61 | Horton | 114—163 |

MILTON BUCHLER, *Primary Examiner.*

ANDREW H. FARRELL, *Examiner.*